Jan. 10, 1956  M. D. SHERMAN  2,730,389
EMERGENCY SANDING DEVICE FOR AUTOMOTIVE VEHICLES
Filed Jan. 20, 1951  2 Sheets-Sheet 1
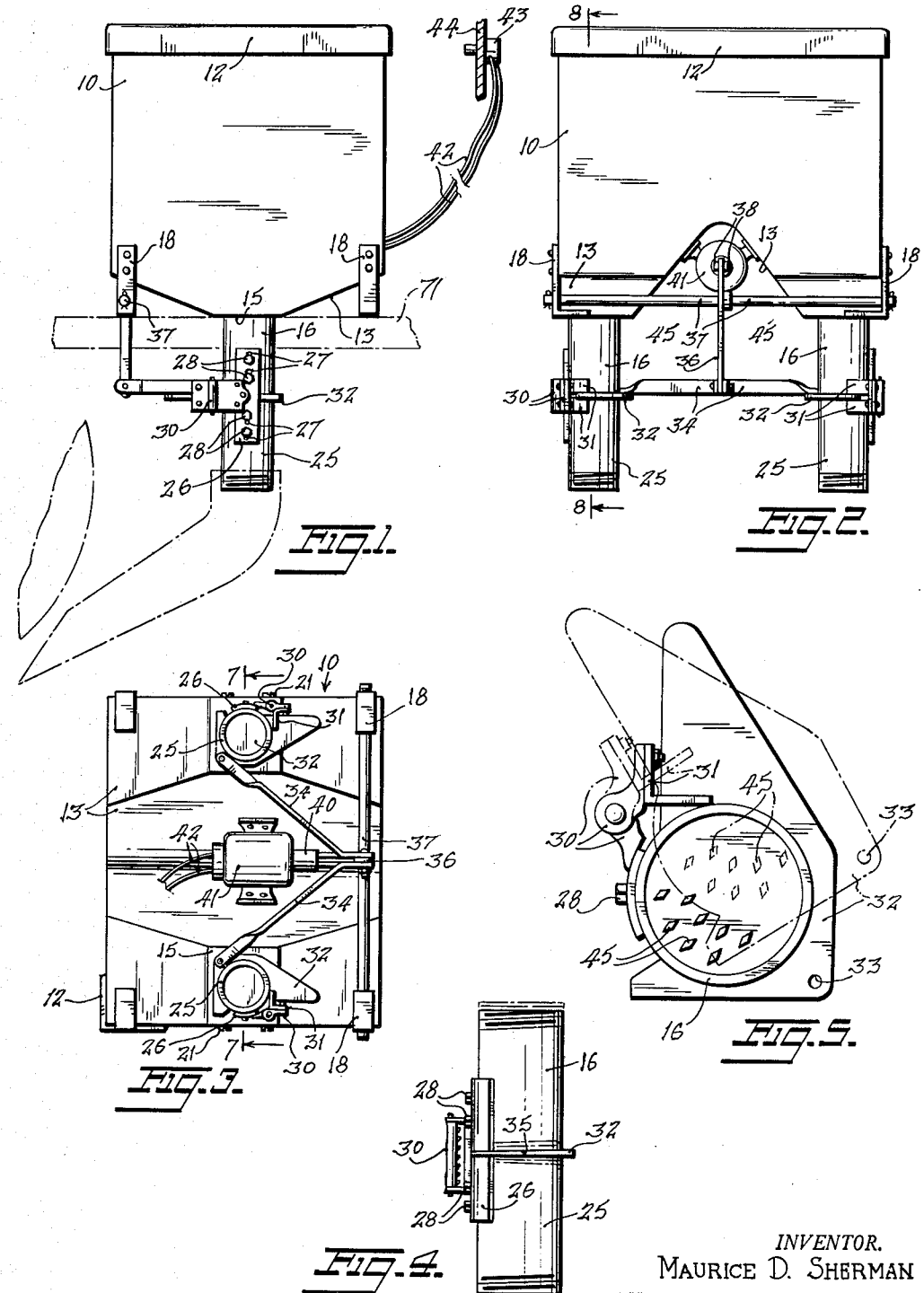
INVENTOR.
MAURICE D. SHERMAN
BY
Zoltan Holochek
ATTORNEY Jan. 10, 1956  M. D. SHERMAN  2,730,389
EMERGENCY SANDING DEVICE FOR AUTOMOTIVE VEHICLES
Filed Jan. 20, 1951  2 Sheets-Sheet 2

INVENTOR.
MAURICE D. SHERMAN
BY
Zoltan H. Plachek
ATTORNEY

United States Patent Office 2,730,389
Patented Jan. 10, 1956

2,730,389

EMERGENCY SANDING DEVICE FOR AUTOMOTIVE VEHICLES

Maurice D. Sherman, Brooklyn, N. Y.

Application January 20, 1951, Serial No. 207,010

2 Claims. (Cl. 291—23)

This invention relates to a safety device for automotive vehicles and, more particularly, to a device for substantially increasing the traction of the drive wheels of a vehicle in situations wherein the same do not develop enough traction to propel the vehicle, for example, when the wheels are mired in snow or mud, or skidding on ice.

One object of the invention is the provision of a device for ejecting sand or other gritty material under both drive wheels of a vehicle.

Another object of the invention is to construct said device in such manner that the same is controlled in its operation from the dashboard of the vehicle.

Still another object of the invention is the provision in said device of means for assuring a positive flow of sand.

A further object of the invention is the provision of means for controlling the degree of flow of the sand.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1 is a side elevational view of the device of the invention with a vehicle wheel and frame illustrated diagrammatically.

Fig. 2 is a rear view of the device.

Figure 3 is a view from beneath of the device.

Figure 4 is an enlarged frontal view of a portion of the device.

Fig. 5 is a plan view of the means shown in Fig. 4.

Figure 8:
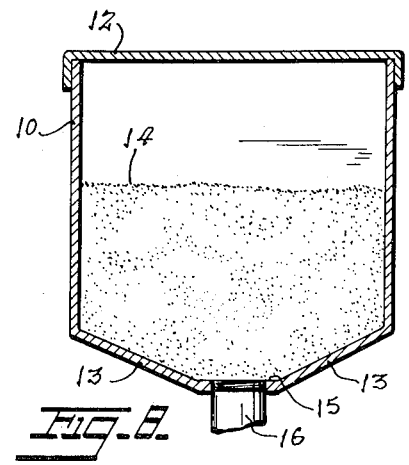
Fig. 8 is a sectional view on line 8—8 of Fig. 2.
Figure 6:
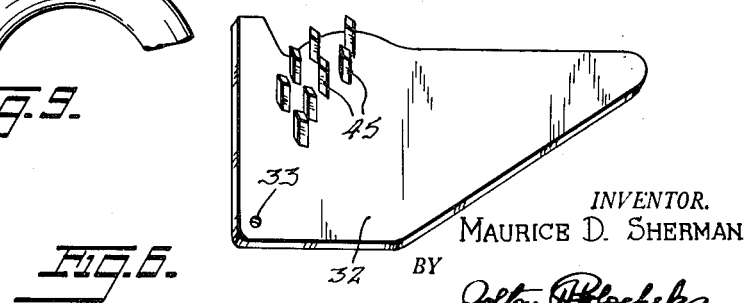
Fig. 6 is a fragmentary isometric view of means shown also in Fig. 5.

Referring now to the drawings, wherein a preferred form of the invention is illustrated, the reference numeral 10 indicates generally a metallic container mountable in the trunk or other compartment of a motor vehicle adjacent the rear wheels 11 thereof. Container 10 is substantially rectangular in cross-section and is provided with a cover or lid 12. The floor 13 of the container is peaked upward toward the front to rear center line of the container so that a quantity of sand 14 or the like placed on said floor tends to slide downward to the side portions of the container; and said side portions of the container incline downward each toward a front to rear central portion 15, see Figs. 1, 3 and 8. It will readily be seen that the sand in the container is readily fed by gravity to one or the other of the low central portions 15. Each said central portion has a pipe or tube 16 extending vertically downward therefrom as will be more fully described hereinafter.

The container 10 is suitably supported on the vehicle frame 17 by corner legs or feet 18 secured to the side walls of the container.

Referring now to Figs. 1–6, each of the pipes 16 is an element of a unit which also includes a second pipe 25 located immediately below the pipe 16. The lower end of pipe 25 is itself located adjacent the forward edge of a drive wheel 11 or is suitably connected with another pipe which is. Each pair of pipes 16 and 25 are interconnected by a strap 26 having therein vertical slots 27 through which bolts 28 extend into the pipes. The said pipes are therefore vertically adjustable relative to one another to increase or decrease the space between the adjacent edges thereof.

Vertically centrally secured to the strap 26 is one leaf of a spring hinge 30 of familiar design. The other leaf of said hinge is secured to a vertical angle bracket 31 having the tail of a valve plate 32 secured thereto. The plate 32 has the shape shown in Figs. 5 and 6 and its free end is provided with a hole 33 by which a link 34 is connected thereto, see Fig. 3. Referring to Fig. 4, the under edge of the pipe 16 tapers downward toward the strap 26 as indicated at 35 and the upper edge of plate 32 tapers likewise almost to a chisel edge.

The construction is such that when the links 34 are pulled the plates 32 move from the full line position of Fig. 5 to the dot-dash position and further, allowing sand to flow downward into the pipes 25; and as the plates 32 return to the full line position they cut through the sand in the pipe. In order to break up lumps in the sand, the upper face of each plate 32 is provided with a plurality of diamond-shaped, tooth-like blocks 45 arranged in staggered relationship in two rows. Preferably, the said blocks are located adjacent the chisel edge of the plate with their longer diagonal axes substantially at right angles to the said edge. The blocks 45 are secured to the plate in any suitable manner such as by butt welding. Means presently to be described are provided to reciprocate the plates 32 back and forth to alternatively open the valve and chop the sand in the pipe to dispose of any lumps.

As best shown in Figs. 2 and 3, the links 34 converge and are pivotally connected to the lower end of a lever 36 secured on a shaft 37 which is journalled in the rear legs 18. The upper end of lever 36 is connected by a pair of links 38 with the core or plunger 40 of a make and break solenoid 41. Said solenoid may be of familiar design and when actuated alternately draws in and releases the plunger 40 to reciprocate the valve plates 32. Preferably the solenoid is mounted in the concavity formed by the peaking of the floor 13 of container 10 and is connected by suitable electric leads 42 with a push button switch 43 mounted on the dashboard 44 of the vehicle. Manipulation of the switch 43 of course actuates the solenoid 41. It will be understood, of course, that variations in the described operating linkage can be made without departing from the spirit of the invention.

Figure 7:
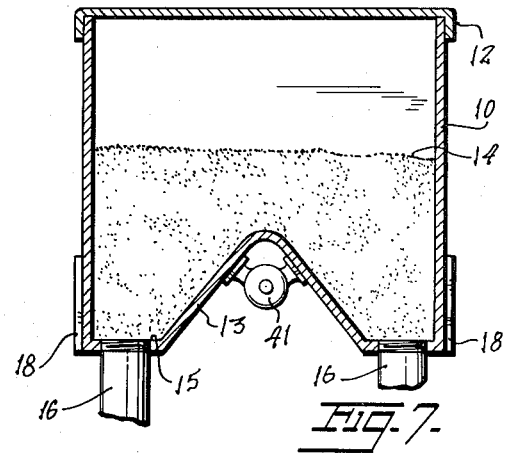
Fig. 7 is an inverted sectional view on line 7—7 of Fig. 3.
Figure 10:
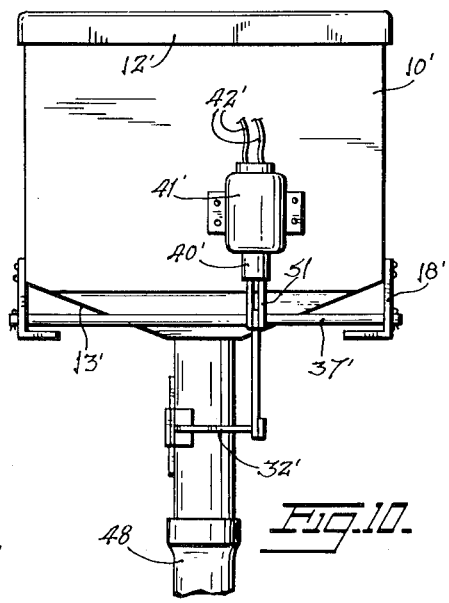
Fig. 10 is a rear elevation of the modified device.
Figure 9:
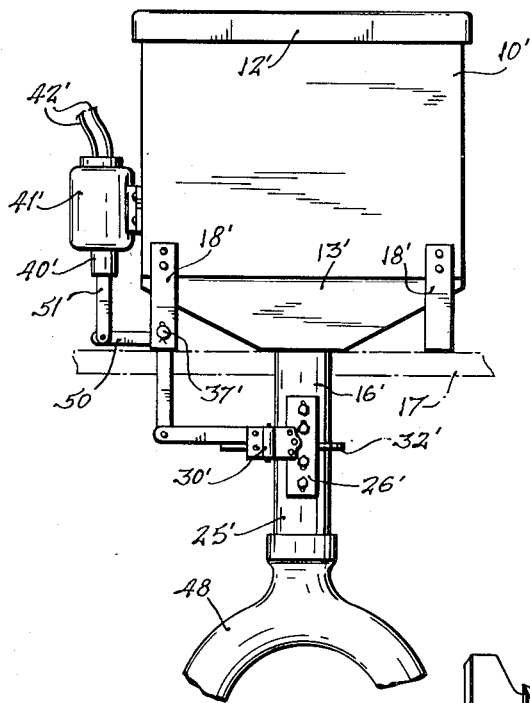
Fig. 9 is a side elevational view of a modified form of the invention.

A modified form of the invention is illustrated in Figs. 9 and 10 wherein like parts are given the same reference numerals as hereinabove with a prime added. In this form of the invention the floor 13' of the container 10' is inclined downward toward its center and one pipe 16' is provided at said center. The pipe 25' however has secured on its lower end the neck of a bifurcate tube 48 having one branch terminating adjacent the front end of each vehicle drive wheel. The valve plate 32' for the pipes 16' and 25' is operated by a bell crank 50 pivoted on the shaft 37' and connected by a link 51 with the plunger 40' of the solenoid 41' which is mounted on the rear wall of the container. The operation of valve plate 32' is the same as described above.

In both forms of the device, the plate 32 is so arranged that it is free to slide and reciprocate in an adjustable space between the pipe members 16 and 25. This space should be enlarged for coarse sand to permit the plate 32 to cut through and to freely move the condensed or abutting sand, out through the space between the pipe members. In other words, some sand must be displaced through the opening between the pipes in order to allow free movements of the plate 32, and said opening is adjustable to accommodate finer or coarser grits.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An electrically actuated safety device for an automobile comprising a walled container having a floor inclined downward towards its center, said container being adapted to retain gritty material, a pipe projecting downward from said floor center, a second pipe in spaced longitudinal alignment with said first-named pipe, means securing said pipes in spaced apart relation, a flat valve plate including a pivot edge extending between said pipes within said space and sealing the first named pipe from said second-named pipe, link means secured at one end to said pivot edge, lever means secured to the other end of said link means and solenoid means engaging said lever to reciprocate said valve plate transversely of the first-named pipe, said securing means including an adjustable strap and a spring hinge, one leaf of which is secured to said strap and the other end to said plate and arranged to urge said plate to sealing position.

2. The combination of claim 1 wherein the upper face of said valve plate includes spaced diamond shaped vertically extended teeth to break up any lumps of gritty material.

References Cited in the file of this patent

UNITED STATES PATENTS

| | | |
|---|---|---|
| 491,161 | De Witt | Feb. 7, 1893 |
| 670,103 | Ham | Mar. 19, 1901 |
| 677,554 | Bacon | July 2, 1901 |
| 746,691 | Gardner | Dec. 15, 1903 |
| 768,393 | McArthur | Aug. 23, 1904 |
| 831,325 | Burlingame et al. | Sept. 18, 1906 |
| 926,586 | Mullen et al. | June 29, 1909 |
| 1,117,894 | Orbin | Nov. 17, 1914 |
| 1,431,307 | Humphrey | Oct. 10, 1922 |
| 1,688,686 | Carlson | Oct. 23, 1928 |
| 1,839,683 | Laskowitz | Jan. 5, 1932 |
| 1,842,506 | Bruggeman | Jan. 26, 1932 |
| 1,867,349 | Brosius | July 12, 1932 |
| 1,933,182 | Pagon et al. | Oct. 31, 1933 |
| 2,435,758 | Snyder | Feb. 10, 1948 |
| 2,437,788 | Richard | Mar. 16, 1948 |